US007342747B2

(12) United States Patent
Oishi

(10) Patent No.: US 7,342,747 B2
(45) Date of Patent: Mar. 11, 2008

(54) RECORDING DISK CARTRIDGE

(75) Inventor: Kengo Oishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 406 days.

(21) Appl. No.: 11/205,112

(22) Filed: Aug. 17, 2005

(65) Prior Publication Data

US 2006/0050436 A1    Mar. 9, 2006

(30) Foreign Application Priority Data

Sep. 3, 2004    (JP)    ............................. 2004-257487

(51) Int. Cl.
*G11B 23/03*    (2006.01)
(52) U.S. Cl. .................................... 360/133
(58) Field of Classification Search ................ 360/133, 360/132, 98.01, 98.02; 369/30.28, 30.77, 369/30.83; 720/720; 206/308.3
See application file for complete search history.

(56) References Cited

U.S. PATENT DOCUMENTS

| | | | | |
|---|---|---|---|---|
| 4,089,414 A | * | 5/1978 | Sandor et al. | ........... 206/308.3 |
| 4,237,503 A | * | 12/1980 | Ragle | ..................... 360/98.02 |
| 4,734,814 A | * | 3/1988 | Fujino et al. | ................ 360/133 |
| 4,823,215 A | * | 4/1989 | DeMoss et al. | .......... 360/98.02 |
| 4,980,883 A | * | 12/1990 | Mutou et al. | ................ 720/720 |
| 5,138,591 A | * | 8/1992 | Ogawa et al. | ........... 369/30.83 |
| 5,159,585 A | * | 10/1992 | Ikedo et al. | ............. 369/30.28 |
| 7,227,816 B2 | * | 6/2007 | Weisser et al. | .......... 369/30.77 |

FOREIGN PATENT DOCUMENTS

JP    2004-22011 A    1/2004

* cited by examiner

*Primary Examiner*—Tianjie Chen
(74) *Attorney, Agent, or Firm*—Sughrue Mion, PLLC

(57) ABSTRACT

A recording disk cartridge includes a plurality of flexible recording disk media integrally rotatably housed within a cartridge case including: a lower plate for configuring a lower wall; at least one inner plate partitioning the recording disk media; and an upper plate for configuring an upper wall, wherein the cartridge further comprises a center core provided for each recording disk medium, having a main body portion and a collar part widening in an outer diameter direction from the main body portion; each recording disk medium is affixed to the collar part of the respective center core; and each inner plate has a central opening configured to accommodate the main body portion of the center core and has a recess part along a lower rim of the central opening for preventing interference with the collar part of the center core disposed on a layer immediately below.

20 Claims, 6 Drawing Sheets

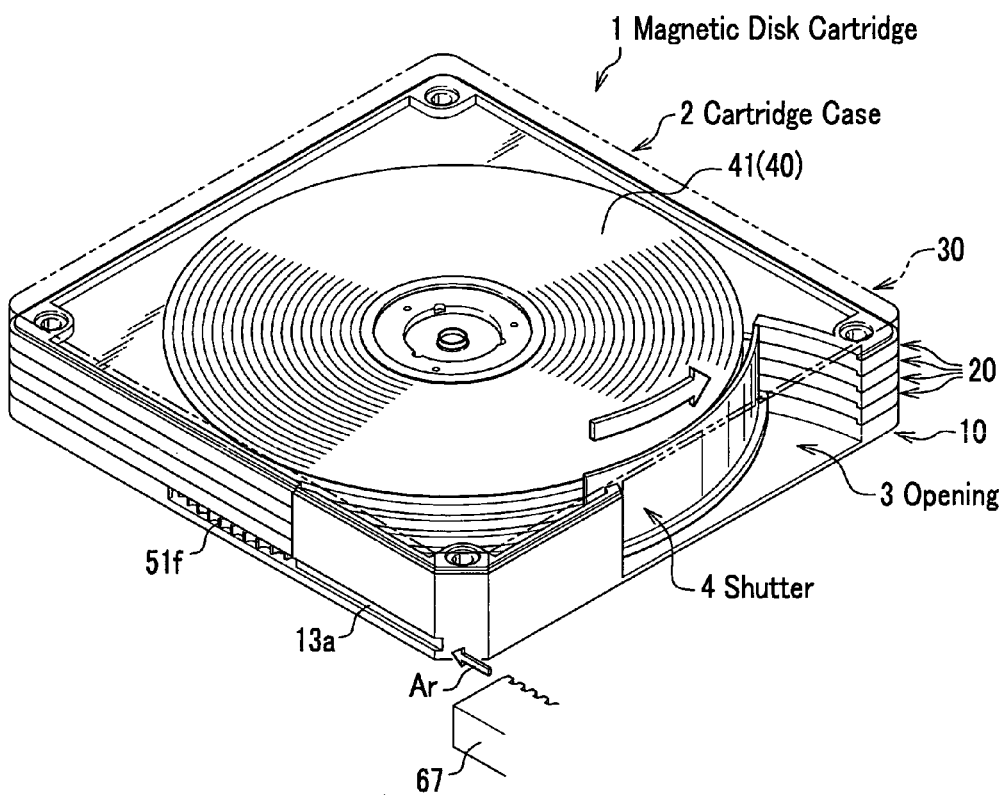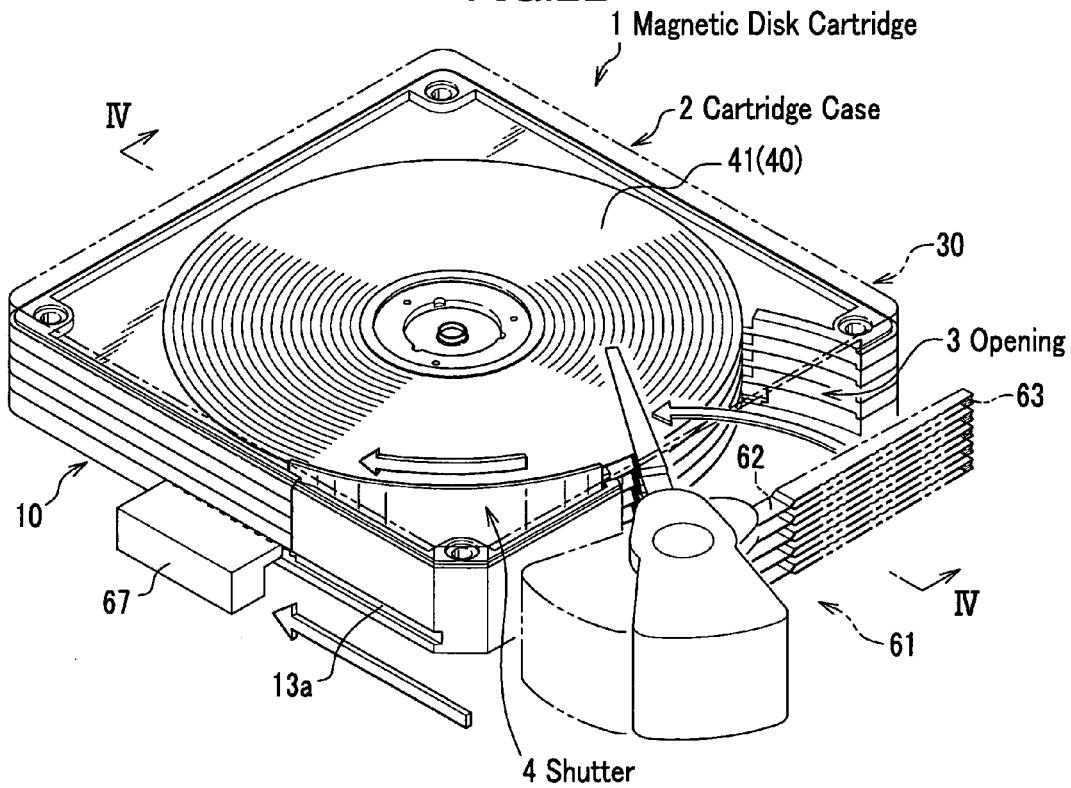

RECORDING DISK CARTRIDGE

CROSS-REFERENCE TO RELATED APPLICATIONS

This application claims the foreign priority benefit under Title 35, United States Code, § 119 (a)-(d), of Japanese Patent Application No. 2004-257487, filed on Sep. 3, 2004 in the Japan Patent Office, the disclosure of which is herein incorporated by reference in its entirety.

BACKGROUND OF THE INVENTION

1. Field of the Invention

The present invention relates to a recording disk cartridge comprising a plurality of flexible recording disk media.

2. Description of the Related Art

Conventionally, as a recording disk medium a flexible recording disk medium is known where a magnetic layer is formed on both faces of a disc-form support body consisting of a flexible material such as a polyester sheet. Although the magnetic disk medium has a merit of speedily accessing data in comparison with a magnetic tape, on the other hand, it has a demerit of a memory capacity being small because a recording area thereof is small.

In order to solve the demerit of the flexible magnetic disk medium, it is conventionally disclosed a magnetic disk cartridge for housing a plurality of magnetic disk media in one cartridge case (for example, see JP 2004-22011A).

In this connection, because a flexible magnetic disk medium is low in rigidity thereof, there is a problem that the medium tends to vibrate in a vertical direction for a recording face when rotated. Therefore, in an invention of JP 2004-22011A each magnetic disk medium is made a configuration of being pinched by shutters. Thus by arranging plate members of high rigidity such as the shutters in a vicinity of the magnetic disk medium, the recording face can be stabilized because the medium becomes along the plate members, accompanied with a rotation of the medium.

However, because a magnetic disk cartridge of JP 2004-22011A is configured of movable shutters arranged by four for one magnetic disk medium, there is a problem that, the cartridge is complicated in a structure thereof and is difficult to keep a parallelism to the medium. In addition, because the magnetic disk cartridge is mass produced goods, it is preferable to be excellent in assembling ability and productivity. Furthermore, the magnetic disk cartridge is preferable to be high in a degree of freedom in a design change so as to easily set a plurality of kinds thereof where number of magnetic disk media is made three, five, and the like.

In addition, when the magnetic disk cartridge is loaded on a magnetic disk drive, a spindle may abrasively push the magnetic disk media in the cartridge case. Therefore, attention needs to be paid during the loading so as not to generate dust.

From such a background is strongly requested a recording disk cartridge having a simple structure, excellent in assembling ability, productivity, and dustproof ability, and also easy in changing a number of recording disk media, which does not generate dust.

SUMMARY OF THE INVENTION

A recording disk cartridge of the present invention is one where a plurality of flexible recording disk media are integrally rotatably housed within a cartridge case comprising: a lower plate for configuring a lower wall parallel to the plurality of the recording disk media; at least one inner plate that is stacked and fixed on the lower plate, and partitions the plurality of the recording disk media; and an upper plate that is stacked and fixed on the inner plate, and configures an upper wall of the cartridge case, wherein the cartridge further comprises a center core provided for each recording disk medium, having a main body portion and a collar part widening in an outer diameter direction from the main body portion; each recording disk medium is affixed to the collar part of the respective center core; and each inner plate has a central opening configured to accommodate the main body portion of the center core and has a recess part along a lower rim of the central opening for preventing interference with the collar part of the center core disposed on a layer immediately below.

In accordance with such the configuration, in the recording disk cartridge of the present invention the cartridge case is configured in a form of stacking up the lower plate, the inner plate, and the upper plate. Therefore, a pair of the inner plate and the recording disk medium is made one unit, all inner plates can be made a same part, and therefore, the recording disk cartridge is excellent in productivity. And because the recording disk medium in an assembling process can also be carried by making a lower plate and an inner plate as a substitute of a tray, the recording disk cartridge is excellent also in assembling ability without damaging and staining the medium. In addition, in a case that it is intended to make a specification of changing a number of recording disk media, it is easy to change the specification because it suffices to mainly change a number of inner plates. Furthermore, because an inner plate of a partition plate is fixed as part of the cartridge case, the recording disk cartridge is easy to realize accuracy such as a parallelism to the recording disk media and can heighten a rotational stability especially at a high speed such as 2000 to 8000 rpm.

In addition, in the recording disk cartridge of the present invention, even when a spindle lifts up the recoding disk media in the cartridge case upon loading the recording disk cartridge, the collar part of the center core is accommodated in the recess part in the inner plate. Therefore, when the tip of the spindle is brought into slidable contact with the bottom face of the center core, contact force is kept small. As a result, generation of dust, which may be caused by abrasion of the tip of the spindle with the bottom face of the center core, is prevented.

It is preferable that, in the recording disk cartridge, the recess part is formed of an abrasion-resistant material different from a material used for the inner plate.

When the recording disk cartridge is loaded on the tip of the spindle from the bottom of the center core, the spindle may lift up the recording disk media in the cartridge case. Even though the lifting of the recording disk media presses the collar part against the recess part of the inner plate, the recess part of the inner plate is prevented from being abraded.

In addition, it is preferable in a recording disk cartridge that a diameter DF of the collar part, a diameter DC of the central opening, and a diameter DB of the main body portion are in a relationship of DF>DC>DB.

By making the diameter DB of the main body portion smaller than the diameter DC of the central opening, the main body portion can be accommodated in the central opening. By making the diameter DF of the collar part larger than the diameter DC of the central opening, the collar part is not allowed to pass the central opening.

In addition, it is preferable in a recording disk cartridge that a diameter DD of the recess part and the diameter DF of the collar part are in a relationship of DD>DF.

By making the diameter DF of the collar part DF smaller than the diameter DD of the recess part, the recess part can accommodate the collar part.

In addition, it is preferable in a recording disk cartridge that a width of a gap formed in a radial direction between the central opening and the main body portion is substantially the same as that of a gap formed in a radial direction between the recess part and the collar part.

By making the width of the gap formed in a radial direction between the central opening of the inner plate and the cylindrical wall of the center core substantially the same as that of the gap formed in a radial direction between the recess part of the inner plate and the collar part of the center core, even when the tip of the spindle is brought into slidable contact with the bottom face of the center core and the center core is misaligned laterally, the intensive collision either of the central opening of the inner plate with the cylindrical wall of the center core, or the recess part of the inner plate with the collar part of the center core, can be prevented.

In addition, it is preferable in a recording disk cartridge that a vertical depth of the recess part is set at at least a total sum of a thickness of the collar part of the center core and a thickness of the adhesive member for affixing the recording disk media to the center core.

By setting the vertical depth of the recess part of the inner plate at at least a total sum of the thickness of the collar part of the center core and the thickness of the adhesive member for affixing the recording disk media to the center core, even when the tip of the spindle is brought into slidable contact with the bottom face of the center core, the upper part of the collar part of the center core is prevented from being pressed against the recess part of the inner plate. As a result, the generation of dust, which may be caused by abrasion of the collar part of the center core with the recess part of the inner plate, is prevented.

Furthermore, it is preferable in a recording disk cartridge that said recording disk media are stacked by engaging the center cores of said recording disk media by means of spacers each disposed between adjacent center cores; and each spacer stops a relative rotation between the adjacent center cores so as to allow the stacked recording disk media to integrally rotate.

In addition, it is preferable in a recording disk cartridge that the spacer is provided with at least one locking protrusion on each of upper and lower sides thereof for engaging with the center core when the recording disk media are stacked, and the center core has holes for engaging with the locking protrusions, each of which holes is provided at a position corresponding to a position of the respective locking protrusion.

Meanwhile, it is preferable in a recording disk cartridge that the main body portion of the center core comprises a circular bottom plate and a cylindrical side wall rising from a peripheral rim of the bottom plate, and the collar part widens in an outer diameter direction from an upper end of the side wall.

In addition, it is preferable in a recording disk cartridge that the spacer comprises a ring-shaped main body portion having a plurality of penetration holes, and the locking protrusions are pins to be pressed into the corresponding penetration holes.

In addition, it is preferable in a recording disk cartridge that the locking protrusions are arranged so as to protrude alternately at an upper side and a lower side of the spacer.

Still furthermore, it is preferable that a recording disk cartridge further comprises a coupling shaft for rotating the recording disk media with being connected to the center core; a bearing ball rotationally freely bearing the coupling shaft inside the recording disk cartridge formed with sequentially combining the lower plate, the at least one inner plate, and the upper plate; and a biasing mechanism for pressing the center core of the recording disk medium positioned uppermost toward the lower plate.

BRIEF DESCRIPTION OF THE DRAWINGS

FIG. 2A is an external perspective view of a magnetic disk cartridge with a shutter closed related to an embodiment of the present invention; FIG. 2B is an external perspective view with the shutter opened related to the magnetic disk cartridge.

DESCRIPTION OF THE PREFERRED EMBODIMENTS

Here will be described an embodiment of the present invention in detail, referring to drawings as needed. In the embodiment will be described a case of adopting a magnetic disk medium as an example of a recording disk medium.

Meanwhile, in a description below, with respect to up/down directions, making it a standard a typical use state of the magnetic disk cartridge, vertical directions for faces of magnetic disk media are called the up/down directions for convenience.

Figure 1:
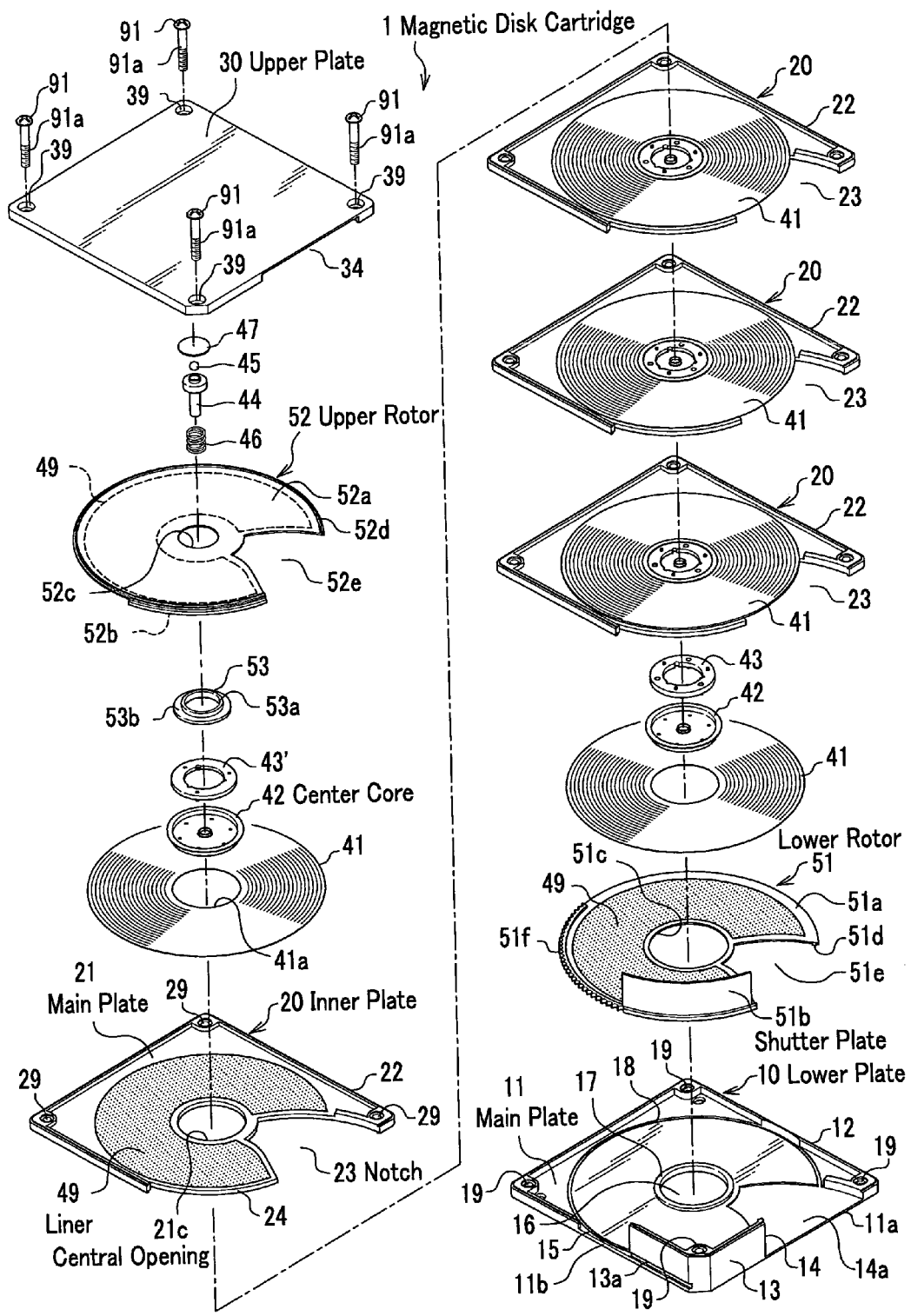
FIG. 1 is an exploded perspective view of a magnetic disk cartridge related to an embodiment of the present invention.

As shown in FIG. 1, in a magnetic disk cartridge 1 of an example of a recording disk cartridge are stacked a lower plate 10 for configuring a lower wall thereof, a plurality of, for example, four inner plates 20, and an upper plate 30 for configuring an upper wall thereof in this order; these are fastened and fixed with four screws 91; and thereby a cartridge case 2 (see FIG. 2A) is configured. Between the lower plate 10 and the lowermost inner plate 20, between any adjacent two of the four inner plates 20, and between the uppermost inner plate 20 and the upper plate 30 is arranged a magnetic disk medium 41, respectively. Each magnetic disk medium 41 is a disc form having an opening 41a at center thereof, and a flange 42c of a center core 42 (see FIG. 6) made of metal is affixed at rim of the opening 41a by an adhesive member. The adhesive member may be a double-sided adhesive tape, such as an A-ring. It is designed that any adjacent two center cores 42 are engaged by spacers 43, 43', and that five magnetic disk media 41 (the magnetic disk media 41 stacked and integrated are assumed to be a disk stack 40) are integrally rotated.

In each of the inner plates 20 is formed a rib 22 for abutting with upper/lower plates at a peripheral rim of a flat main plate 21. Part of a right near side of each of the inner plates 20 in FIG. 1 forms a notch 23 so that magnetic heads 63 (see FIG. 4) can easily move onto the magnetic disk media 41. At the portion of the notch 23 is not formed the rib 22, and therefore, when the inner plates 20 are stacked up, an opening 3 is formed on a side face of the cartridge case 2 as shown in FIG. 2A.

The opening 3 is opened/closed by a shutter 4 that coaxially rotates with the disk stack 40. As shown in FIG. 1, the shutter 4 is configured by combining a lower rotor 51 and an upper rotor 52.

Next will be described each member in more detail.

The lower plate 10 is designed at a peripheral rim of a main plate 11 of a substantially square to mainly form a side wall 13 and a rib 12 for abutting with a lower face of the rib 22 of the lowermost inner plate 20. The side wall 13 is vertically provided in a predetermined range, for example, around one third range of one edge, from one corner of the main plate 11 (near side corner in FIG. 1), and is formed approximately in height of the inner plates 20 stacked.

A sector portion toward a center of the main plate 11 from one edge 11a (one edge of right near side in FIG. 1) continuing into the side wall 13 of the main plate 11 is designed to form a depression 14a lowered by one step, not to form the rib 12 at the peripheral rim of the main plate 11, and to become an opening 14. Thus it becomes easy for the magnetic heads 63 to proceed into the cartridge case 2.

An approximately central one third range of the other edge 11b (one edge of left near side in FIG. 1) continuing into the side wall 13 of the main plate 11 is designed not to form the rib 12 but to become an opening 15 so that a gear 51f of the lower rotor 51 described later can be exposed. In addition, outside the side wall 13 of the other edge 11b is formed a groove 13a along a periphery of the lower plate 10, continuing into the opening 15. The groove 13a is designed to be a passage where a shutter open gear 67 (see FIG. 2A) of a magnetic disk drive proceeds in a direction shown in an arrow Ar of FIG. 2A and enters in the opening 15 in order to engage in the gear 51f.

The rib 12 is formed so as to protrude upward across all periphery except the side wall 13 and the openings 14,15 out of a peripheral rim of the main plate 11. At center of the main plate 11 is formed a circular opening 16 for exposing the center core 42 provided inside the lowermost magnetic disk medium 41. At upper rim of the opening 16, across all periphery thereof is formed a rib 17 outside which a central opening 51c formed at center of the lower rotor 51 fits. The rib 17 rotationally freely supports the lower rotor 51.

In addition, on an upper face (inner face) of the main plate 11 is formed a circular lower rotor support groove 18 at a position corresponding to peripheral rim of the lower rotor 51. The lower rotor support groove 18 rotationally freely supports the lower rotor 51 coaxially with the magnetic disk media 41 by engaging in a rib 51d (see FIG. 4) formed downward at a peripheral rim of the lower rotor 51.

In addition, at four corners of the main plate 11 are formed screw holes 19 where female threads are formed, respectively, with penetrating through the up/down directions.

Figure 4:
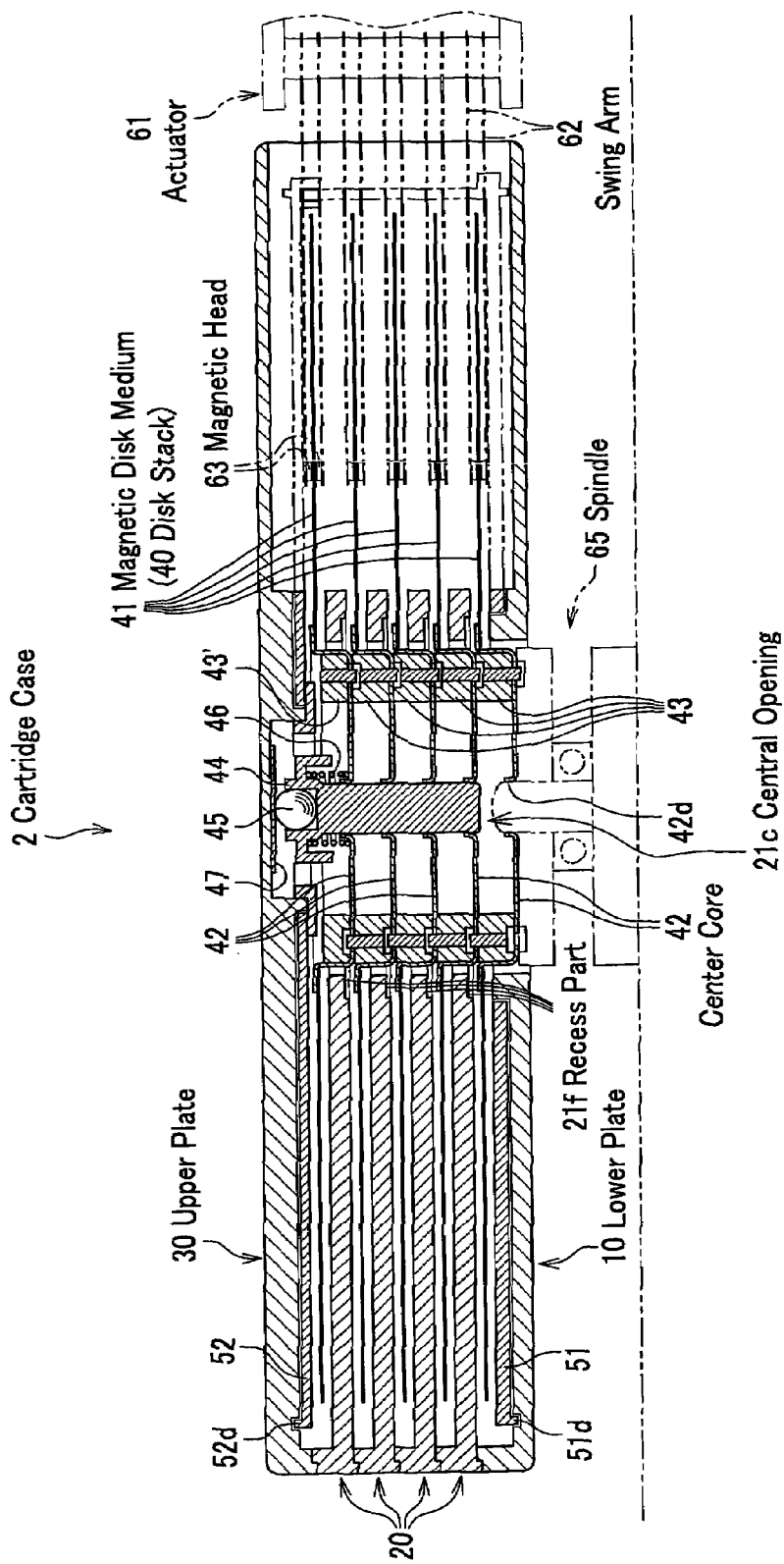
FIG. 4 is a section view taken along a line IV-IV in FIG. 2B of the magnetic disk cartridge loaded on a magnetic disk drive.
Figure 5:
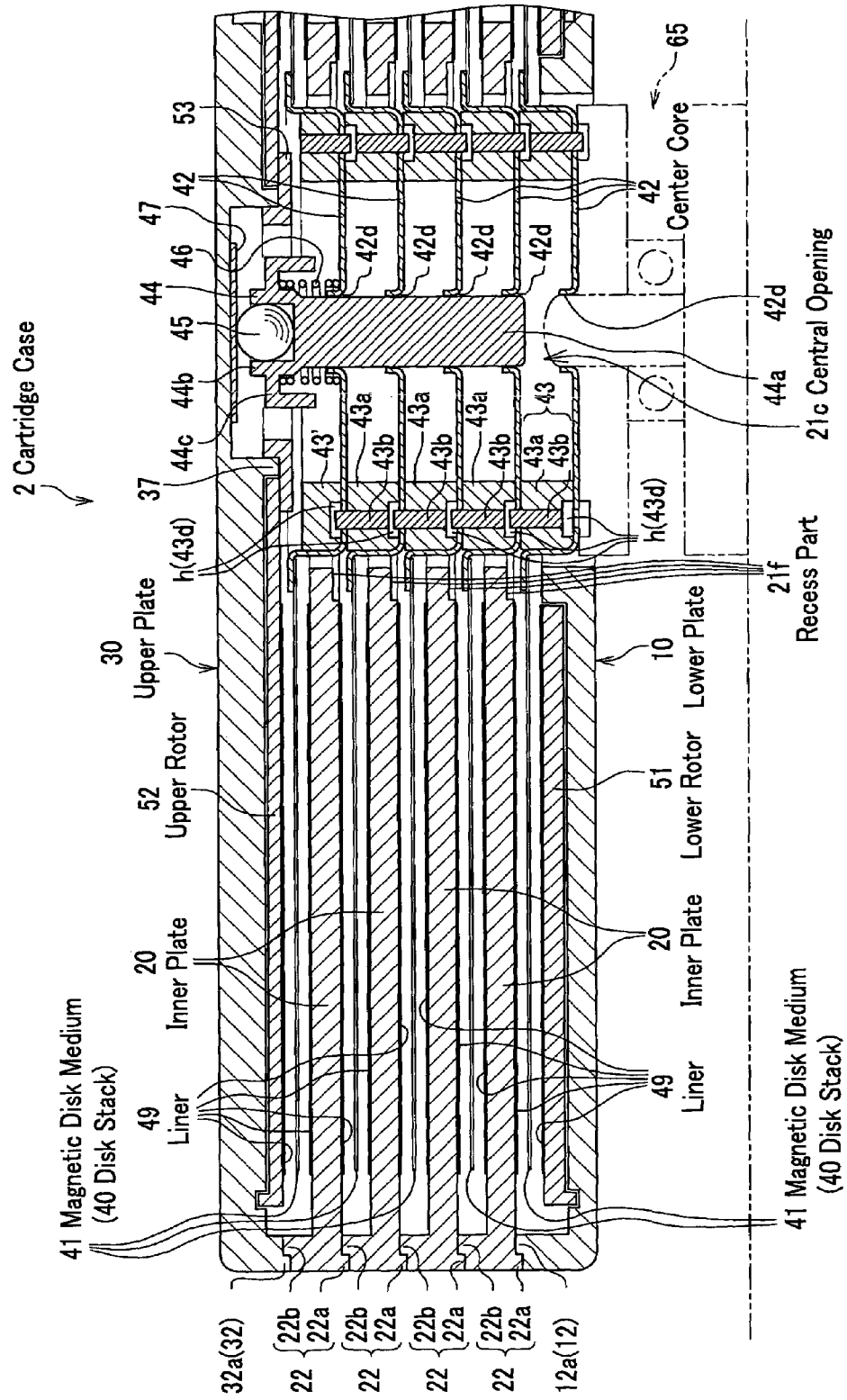
FIG. 5 is a partially enlarged drawing of FIG. 4.

The main plate 21 of each of the inner plates 20 is substantially a square, and a portion corresponding to one of four corners of the square is designed to be an arc (arc portion 24) one size larger than the magnetic disk medium 41. At one edge (right near side in FIG. 1) continuing into the arc portion 24 is formed the notch 23 into a sector. The rib 22 protrudes the up/down directions and is formed across all periphery except the arc portion 24 and the notch 23 out of periphery rim of the main plate 21. At center of the main plate 21 is formed a central opening 21c for enabling the upper center core 42 to be exposed and to be coupled with the lower center core 42. As shown in FIGS. 4 and 5, the main plate 21 is provided with an annular recess part 21f, on the bottom thereof along the rim of the central opening 21c. The recess part 21f accommodates a flange 42c of the center core 42, which will be described below. In addition, the vertical depth of the recess part 21f is set at at least a total sum of a thickness of the flange 42c of the center core 42 and a thickness of the adhesive member. It is also desirable that the recess part 21f is formed of an abrasion-resistant material different from the material used for the inner plate 20, such as metal and resin having excellent abrasion resistance, for example, polytetrafluoroethylene, polyoxymethylene resin and the like. In addition, a width of a gap formed in a radial direction between the central opening 21c of the inner plate 20 and the side wall 42b of the center core 42 is substantially the same as that of a gap formed in a radial direction between the recess part 21f of the inner plate 20 and the flange 42c of the center core 42. The diameter DF of the flange 42c of the center core 42, the diameter DC of the central opening 21c of the inner plate 20, and the diameter DB of the side wall 42b are in the following relationship: DF>DC>DB. The diameter DD of the recess part 21f of the inner plate 20, and the diameter DF of the flange 42c are in the following relationship: DD>DF.

In addition, at three corners of the main plate 21, with penetrating through the three corners in the up/down directions, are formed holes 29 through which screw shaft portions 91a of the screws 91 are inserted, respectively.

Figure 3:
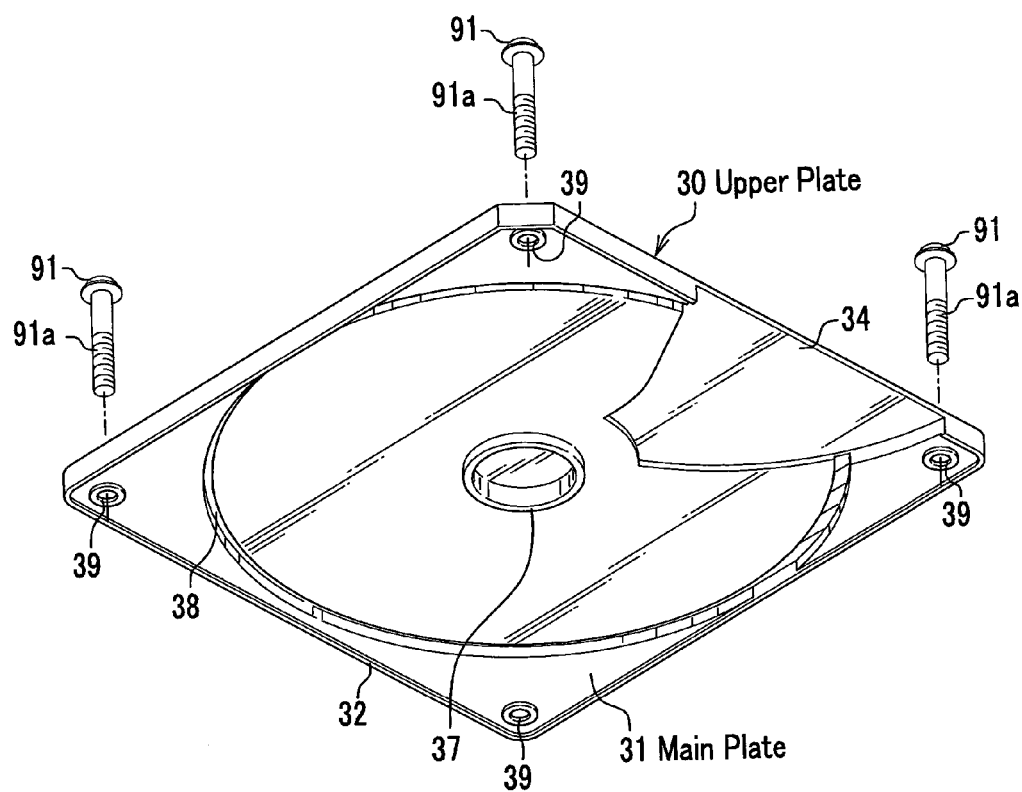
FIG. 3 is a perspective view showing an inner face of an upper plate.

The upper plate 30 is formed substantially symmetric to the lower plate 10. As shown in FIG. 3, in the upper plate 30, on a substantially square main plate 31 are formed a depression 34 corresponding to the depression 14a, a rib 37 corresponding to the rib 17, and an upper rotor support groove 38 corresponding to the lower rotor support groove 18. Meanwhile, at center of the main plate 31 are not formed an opening and a side wall corresponding to the side wall 13.

In addition, at a peripheral rim of the main plate 31, across all periphery except the depression 34 is formed a rib 32 protruding downward.

In addition, at four corners of the main plate 31 are respectively formed holes 39 that enables the screw shaft portions 91a of the screws 91 to be penetrated therethrough.

The lower rotor 51 is designed so that: a central opening 51c, a notch 51e, a rib 51d, and the gear 51f are formed on a ring-form lower rotor plate 51a substantially same as the magnetic disk media 41; and a shutter plate 51b is vertically provided at the peripheral rim of the lower rotor plate 51a. The central opening 51c is formed as a circle fitting outside the rib 17, the notch 51e is formed as a sector corresponding to the depression 14a. In addition, the rib 51d is provided downward at a peripheral rim of a lower face of the lower rotor plate 51a, corresponding to the lower rotor support groove 18.

The shutter plate 51b is a blocking member for blocking the opening 3 (see FIG. 2A) and the disk stack 40 and is vertically provided along the peripheral rim of the lower rotor plate 51a with neighboring the notch 51e. The gear 51f is an engaged portion for opening/closing the shutter 4 (see FIG. 2A) from outside of the magnetic disk cartridge 1, and is formed at a peripheral rim of the lower rotor plate 51a within a predetermined range with neighboring the shutter plate 51b.

The upper rotor 52 is designed to be substantially symmetric to the lower rotor 51: the upper rotor 52 comprises an upper rotor plate 52a similar to the lower rotor plate 51a; on the upper rotor plate 52a are formed a central opening 52c fitting outside the rib 37 of the upper plate 30, a notch 52e corresponding to the depression 34, and a rib 52d corresponding to the upper rotor support groove 38. In addition, at a portion adjacent to the notch 52e of a peripheral rim of the upper rotor plate 52a is formed a shutter groove 52b, corresponding to the shutter plate 51b of the lower rotor 51. The lower rotor 51 and the upper rotor 52 are designed to integrally rotate by the shutter groove 52b and upper end rim of the shutter plate 51b engaging.

The upper rotor 52 is rotationally freely supported by the upper plate 30 by the central opening 52c fitting outside the rib 37 of the upper plate 30, and the rib 52d engaging in the upper rotor support groove 38. Meanwhile, the upper rotor 52 is prevented from dropping from the upper plate 30 by a stop member 53. The stop member 53 comprises a cylindrical portion 53a inserted in the rib 37 (see FIG. 3) and a flange 53b formed at one end of the cylindrical portion 53a; the cylindrical portion 53a is inserted in the central opening 52c from a lower side of the upper rotor 52 and is fixed at the rib 37 by ultrasonic welding, adhesion, and the like.

As an enlarged section drawing shown in FIG. 5, an upper face of the lower rotor 51, upper and lower faces of the inner plates 20, and a lower face of the upper rotor 52 are faces opposing the magnetic disk media 41, where liners 49 are affixed across portions opposing the media 41, respectively.

The liners 49 consist of, for example, a non-woven cloth such as a polyester fiber and a blended fabric fiber of rayon and polyester.

Next will be described a stack structure of the lower plate 10, the inner plates 20, and the upper plate 30.

In the rib 12 of the lower plate 10, as shown in FIG. 5, an inside thereof is formed higher by one step than an outside thereof, and thereby a male type step portion 12a is formed; each rib 22 of the inner plates 20 forms a female type step portion 22a protruding downward at outermost periphery, and thus a periphery of the male type step portion 12a and an inner perimeter of the female type step portion 22a become able to be fitted. In addition, when the lower plate 10, the inner plates 20, and the upper plate 30 are fastened by the screws 91 (see FIG. 1), an upper face of the male type step portion 12a and a corresponding portion of a lower face of the lowermost inner plate 20 are designed to be contacted. Thus, because the rib 12 of the lower plate 10 and the rib 22 of the inner plate 20 are sealingly abutted and fitted each other, an invasion of dust into the cartridge case 2 from outside is prevented.

Similarly, any adjacent two of the inner plates 20, and the uppermost inner plate 20 and the upper plate 30 are stacked by being sealingly abutted and fitted each other. In other words, on an upper face of each of the inner plates 20 is formed a male type step portion 22b where an inside of the upper face is formed higher by one step; at a rib 32 of the upper plate 30 is formed a female type step portion 32a of which outermost periphery protrudes downward by one step. And the male type step portion 22b of one inner plate 20 and the female type step portion 22a of an upper adjacent inner plate 20 are sealingly abutted and fitted each other; the male type step portion 22b of the uppermost inner plate 20 and the female type step portion 32a of the upper plate 30 are sealingly abutted and fitted, and stacked. Thus any adjacent two of the ribs 12, 22, 32 are sealingly abutted and fitted each other, and dust from outside is prevented from invading into the cartridge case 2. In addition, as soon as the lower plate 10, the inner plates 20, and the upper plate 30 are stacked, the side wall 13 of the cartridge case 2 is configured.

In addition, both of the female type step portion 22a and the male type step portion 22b protrude from the main plate 21 beyond a thickness of the liner 49. Therefore, after affixing the liners 49 on the inner plates 20 and making an assembly, then even if placing it on a work bench, the liners 49 do not contact the work-bench, and accordingly, are not contaminated with dust and the like.

Such the configuration of the cartridge case 2 by stacking the inner plates 20 facilitates a change of a number of the magnetic disk media 41; although a height change of the side wall 13 and that of the shutter plate 51b are requested, a number of housing units of the magnetic disk media 41 formed within the cartridge case 2 can be changed only by mainly changing a number of the inner plates 20.

Next will be described the magnetic disk media 41 and a stack structure thereof. The magnetic disk media 41 are ones where magnetic paint is coated on both faces of a resin sheet, for example, such as polyester.

Figure 6:
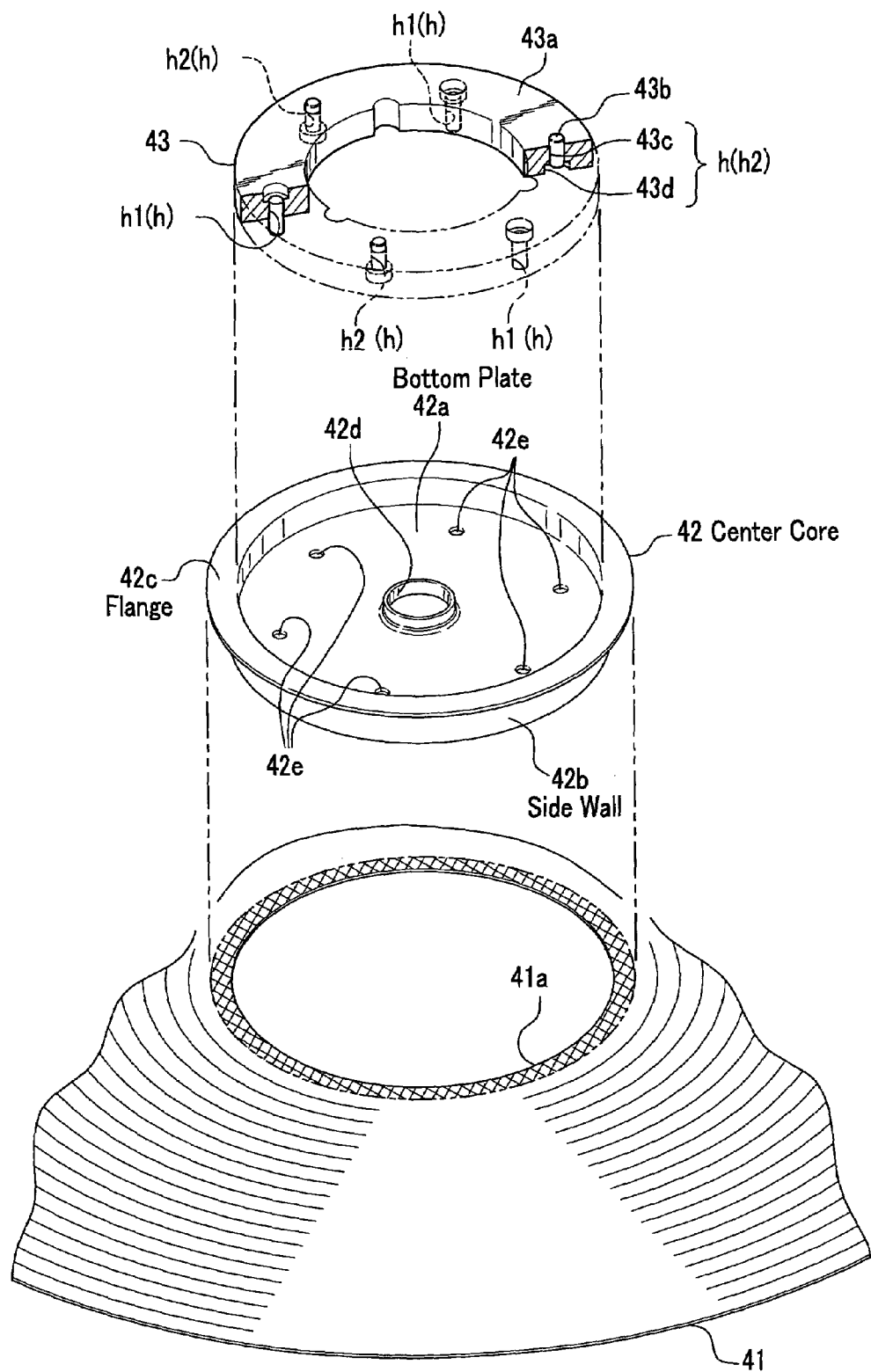
FIG. 6 is an exploded perspective view showing a stack structure of magnetic disk media.

As shown in FIG. 6, each of the center cores 42 is one substantially made a hat form with draw forming a metal plate by press: the center core 42 is mainly configured of a circular bottom plate 42a, a low cylindrical side wall 42b rising from peripheral rim of the bottom plate 42a, and a flange 42c widening in an outer diameter direction from an upper end of the side wall 42b. The bottom plate 42a and the side wall 42b together are referred to as the main body portion of the center core in the embodiments. The flange 42c is referred to as the collar part of the center core in the embodiments. At center of the bottom plate 42a is formed a center hole 42d, and at rim of the plate 42a are formed six small holes 42e at a distance of 60 degrees, making the center hole 42d a center thereof.

A spacer 43 is provided between adjacent center cores 42, keeps a distance of each of the center cores 42, stops a rotation between each of the center cores 42, and functions so that the stacked magnetic disk media 41 integrally rotate. The spacer 43 is mainly configured of a main body portion 43a shaped like a ring from a resin and metallic pins 43b pressed into the main body portion 43a. In the main body portion 43a are formed six penetration holes h at positions corresponding to the small holes 42e of the center core 42, wherein each of the penetration holes h consists of a small diameter hole portion 43c, where the pin 43b is pressed, and a large diameter hole portion 43d that is coaxial with and slightly larger in diameter than the small diameter hole portion 43c. The six penetration holes h are designed to be upside down in any two adjacent ones. In other words, penetration holes h2 of both adjacent penetration holes h1, where each the large diameter hole portion 43d is positioned at an upper side thereof, are arranged so that the large diameter hole portion 43d is positioned at a lower side thereof.

Into each of the small diameter portions 43c is pressed each one pin 43b from upper/lower sides thereof, one end of the pin 43b is positioned at a boundary of the large diameter hole portion 43d and the small diameter hole portion 43c, and the other end thereof protrudes outside the small diameter portion 43c. The large diameter hole portion 43d serves a function of a clearance at ends of pins 43b of adjacent spacers 43.

As shown in FIG. 5, such the spacers 43 are provided between adjacent center cores 42, respectively. One pin 43b protruding toward a lower side of each of the spacers 43 enters in a small hole 42e of one center core 42 at the lower side of the spacer 43, and stops a rotation relative to the center core 42 at the lower side. If there is another spacer 43 at a still lower side than the center core 42 at the lower side, a floating-up of the spacer 43 for the center core 42 is prevented by the pin 43b entering the large diameter hole portion 43d in the spacer 43 at the lower side. The other pin 43b protruding toward an upper side of the spacer 43 enters in a small hole 42e of the other center core 42 at the upper side of the spacer 43, and stops a rotation relative to the center core 42 at the upper side. If there is another spacer 43 at a still upper side than the center core 42 at the upper side, the top end of the pin 43b enters in the large diameter hole portion 43d in the spacer 43 at the upper side.

Meanwhile, because at an upper side the uppermost center core 42 has no center core 42 to stop a rotation thereof, at the upper side is arranged a thin top spacer 43' in thickness where the pin 43b is protruded only downward.

The magnetic disk media 41 thus stacked, namely, the disk stack 40, are stably supported in rotation by a coupling shaft 44, a bearing ball 45, a compression coil spring 46, and a center plate 47.

As shown in FIG. 5, the coupling shaft 44 lessens a central fluctuation between the center cores 42 stacked, holds the bearing ball 45 and the compression coil spring 46, and comprises a shaft portion 44a, a ball holding portion 44b, and a spring holding portion 44c. The shaft portion 44a is a columnar form that can be inserted through the center holes 42d of the center cores 42. At an upper end of the shaft portion 44a the ball holding portion 44b is formed into a cylindrical form with a bottom opening to an upper side thereof A depth of the ball holding portion 44b is larger than a radius of the bearing ball 45, and therefore, the bearing ball 45 is stably held at the ball holding portion 44b. The spring holding portion 44c consists of a form where a cylindrical form with a bottom is turned down at a side of an outer diameter of the ball holding portion 44b, and the compression coil spring 46 is arranged in a cylindrical space between the shaft portion 44a and the spring holding portion 44c. Meanwhile, although a length of the coupling shaft 44 is arbitrary, in the embodiment it is one reaching the second center core 42 from the lowermost one; the center hole 42d of the lowermost center core 42 is opened so that a spindle 65 of a magnetic disk drive can proceed.

The center plate 47 is a slide member affixed at the center of an inner face of the upper plate 30, that is, on a flat face of an inside of the rib 37. The center plate 47 can be composed of, for example, a material excellent in sliding ability and abrasion resistance such as polyoxymethylene and ultra high molecular weight polyethylene.

Although the bearing ball 45 consists of a sphere made of, for example, steel used for a ball bearing, it may also be composed of a material excellent in sliding ability and abrasion resistance, for example, such as polytetrafluoroethylene and polyoxymethylene. The bearing ball 45 is arranged within the ball holding portion 44b of the coupling shaft 44, abuts with the bottom face of the ball holding portion 44b; and a center of an inner face of the upper plate 30, that is, the center plate 47 by a point contact, and rotationally supports the disk stack 40.

In the compression coil spring 46 one end (upper end) is held by the spring holding portion 44c of the coupling shaft 44; the other end (lower end) abuts with an upper face of the uppermost center core 42, and energizes the stacked center cores 42 to the side of the lower plate 10, that is, to the side of the spindle 65 of the magnetic disk drive. Thus the center cores 42 do not jounce within the cartridge case 2, and the fluctuation of the magnetic disk media 41 is prevented in rotation thereof.

A magnetic disk drive for recoding/reproducing data for the magnetic disk cartridge 1 rotates, as shown in FIG. 4, the disk stack 40 by the spindle 65. The spindle 65 attracts the lowermost center core 42 by magnetic force, enters in the center hole 42d of the center core 42, and thereby matches an axis thereof with that of the disk stack 40. At this time, because the spindle 65 slightly lifts up the center cores 42 with resisting an energizing force of the compression coil spring 46, as shown in FIGS. 4 and 5, each of the magnetic disk media 41 is positioned at center of a space formed between the lower rotor 51 and the lowermost inner plate 20, between upper and lower inner plates 20, and between the uppermost inner plate 20 and the upper rotor 52. The magnetic heads 63 are provided at top ends of swing arms 62. Each of the magnetic heads 63 is arranged on both faces of each of the magnetic disk media 41.

The magnetic disk cartridge 1 thus described can prevent, in no use thereof as shown in FIG. 2A, an invasion of dust thereto by closing the opening 3 with rotating the shutter 4 in a counterclockwise direction of the drawing; in use thereof as shown in FIG. 2B, when loaded on the magnetic disk drive, the shutter open gear 67 fits in the groove 13a, is guided thereby, engages in the gear 51f, and rotates the shutter 4 in a clockwise direction of the drawing.

In addition, the disk stack 40 rotates by the spindle 65 rotating. After then, the swing arms 62 rotate by being driven with an actuator 61, and each of the magnetic heads 63 are moved onto each face of the magnetic disk media 41.

When recording data on the magnetic disk media 41 with the magnetic heads 63, the data is recorded thereon by sending a signal to the magnetic heads 63 by a control circuit not shown; when reproducing data from the magnetic disk medium 41, a signal is output by detecting a change of a magnetic field on the medium 41 with the magnetic heads 63a.

At this time, dust on the magnetic disk media 41 is removed by the liners 49 appropriately touching respective media 41.

After the use of the magnetic disk cartridge 1, the magnetic heads 63 are retracted from the cartridge case 2, thereafter ejects the magnetic disk cartridge 1; thereby the gear 51f is driven by the shutter open gear 67, and the shutter 4 closes the opening 3.

Thus because the magnetic disk cartridge 1 has a plurality of the magnetic disk media 41, data transfer can be performed at a higher speed by simultaneously accessing data with a plurality of magnetic heads 63.

In addition, because the cartridge case 2 is configured by stacking up the inner plates 20, it is easy to perform a specification change of making a number of magnetic disk media 41 a different one. Then, in assembling the magnetic disk cartridge 1, because the magnetic disk media 41 can be handled with being placed on the inner plates 20 and the lower rotor 51 built in the lower plate 10, an occasion of touching the magnetic disk media 41 can be reduced and a quality of the cartridge 1 can be further stablized.

In addition, because each of the inner plates 20 is stacked on the lower plate 10 or another inner plate 20 and is fixed, the magnetic disk cartridge 1 can make it higher a parallelism to the magnetic disk media 41, can stabilize a rotation of the media 41, and enable a higher speed rotation of the media 41, furthermore a higher speed of a data transfer.

As described above, in the magnetic disk cartridge 1, even when the tip of the spindle 65 is brought into slidable contact with the bottom face of the center core 42 and lifts up the center core 42, the flange 42c of the center core 42 is accommodated in the recess part 21f of the inner plate 20, and therefore, contact force of the tip of the spindle 65 against the bottom face of the center core 42 is kept small. As a result, generation of dust, which may be caused by abrasion of the tip of the spindle 65 with the bottom face of the center core 42, is prevented, which in turn prevents generation of error upon recording/reproducing data and damage to the magnetic disk media 41. In addition, since the contact force of the spindle 65 against the bottom face of the center core 42 is kept small, the generation of scratches can be avoided, excellent chucking precision can be maintained, and excellent appearance of the center core 42 can be maintained.

In addition, in the magnetic disk cartridge 1, the recess part 21$f$ of the inner plate 20 is formed of an abrasion-resistant material, which prevents the recess part 21$f$ of the inner plate 20 from being abraded.

Further, since the diameter DB of the side wall 42$b$ of the center core 42 is smaller than the diameter DC of the central opening 21$c$ of the inner plate 20, the side wall 42$b$ of the center core 42 can be accommodated in the central opening 21$c$ of the inner plate 20. In contrast, since the diameter DF of the flange 42$c$ of the center core 42 is larger than the diameter DC of the central opening 21$c$ of the inner plate 20, the flange 42$c$ of the center core 42 is not allowed to pass the central opening 21$c$ of the inner plate 20.

Moreover, since the diameter DF of the flange 42$c$ of the center core 42 is smaller than the diameter DD of the recess part 21$f$, the recess part 21$f$ can accommodate the flange 42$c$ of the center core 42.

Further in the magnetic disk cartridge 1, the width of the gap formed in a radial direction between the central opening 21$c$ of the inner plate 20 and the side wall 42$b$ of the center core 42 is substantially the same as that of the gap formed in a radial direction between the recess part 21$f$ of the inner plate 20 and the flange 42$c$ of the center core 42. Therefore, even when the tip of the spindle 65 is brought into slidable contact with the bottom face of the center core 42 and the center core 42 is misaligned laterally, the intensive collision either of the central opening 21$c$ of the inner plate 20 with the side wall 42$b$ of the center core 42, or the recess part 21$f$ of the inner plate 20 with the flange 42$c$ of the center core 42, can be prevented. Accordingly, the generation of dust, which may be caused by abrasion of the central opening 21$c$ of the inner plate 20, the side wall 42$b$ of the center core 42, the recess part 21$f$ of the inner plate 20, the flange 42$c$ of the center core 42, can be prevented, which in turn prevents the magnetic disk media 41 from being damaged.

Still in the magnetic disk cartridge 1, the vertical depth of the recess part 21$f$ of the inner plate 20 is set at at least a total sum of the thickness of the flange 42$c$ of the center core 42 and the thickness of the adhesive member for affixing the magnetic disk media 41 to the center core 42. Therefore, the flange 42$c$ of the center core 42 and the recess part 21$f$ of the inner plate 20 are prevented from being abraded. As a result, no dust is generated and the magnetic disk media 41 can be prevented from being damaged.

Thus, although the embodiment of the present invention is described, the invention is not limited thereto and can be embodied with being changed as needed. For example, although in the embodiment the magnetic disk medium 41 is applied to a recording disk medium, an optical recording medium where data is recorded by light can also be applied thereto.

In addition, although in the embodiment the lower plate 10, the inner plates 20, and the upper plate 30 are fastened and fixed by the screws 91, they can also be integrally fixed by any of adhesion and deposition.

What is claimed is:

1. A recording disk cartridge comprising:
   a plurality of flexible recording disk media integrally rotatably housed within a cartridge case, the case comprising:
   a lower plate for configuring a lower wall parallel to said plurality of the recording disk media;
   at least one inner plate that is stacked and fixed on said lower plate, and partitions said plurality of the recording disk media; and
   an upper plate that is stacked and fixed on said inner plate, and configures an upper wall of said cartridge case,
   wherein the cartridge further comprises a plurality of center cores each of which is provided for each recording disk medium and has a main body portion and a collar part widening in an outer diameter direction from the main body portion;
   each recording disk medium is affixed to the collar part of the respective center core; and
   each inner plate has a central opening configured to accommodate the main body portion of the center core and has a recess part along a lower rim of the central opening for preventing interference with the collar part of the center core disposed on a layer immediately below.

2. A recording disk cartridge according to claim 1, wherein the recess part is formed of an abrasion-resistant material different from a material used for the inner plate.

3. A recording disk cartridge according to claim 2, wherein a diameter DF of the collar part, a diameter DC of the central opening, and a diameter DB of the main body portion are in a relationship of DF>DC>DB.

4. A recording disk cartridge according to claim 3, wherein a diameter DD of the recess part and the diameter DF of the collar part are in a relationship of DD>DF.

5. A recording disk cartridge according to claim 4, wherein a width of a gap formed in a radial direction between the central opening of the inner plate and the main body portion of the center core is substantially the same as that of a gap formed in a radial direction between the recess part of the inner plate and the collar part of the center core.

6. A recording disk cartridge according to claim 5, wherein a vertical depth of the recess part of the inner plate is set at at least a total sum of a thickness of the collar part of the center core and a thickness of the adhesive member for affixing the recording disk media to the center core.

7. A recording disk cartridge according to claim 1, wherein a diameter DF of the collar part, a diameter DC of the central opening, and a diameter DB of the main body portion are in a relationship of DF>DC>DB.

8. A recording disk cartridge according to claim 7, wherein a diameter DD of the recess part and the diameter DF of the collar part are in a relationship of DD>DF.

9. A recording disk cartridge according to claim 8, wherein a width of a gap formed in a radial direction between the central opening and the main body portion is substantially the same as that of a gap formed in a radial direction between the recess part and the collar part.

10. A recording disk cartridge according to claim 9, wherein a vertical depth of the recess part is set at at least a total sum of a thickness of the collar part of the center core and a thickness of the adhesive member for affixing the recording disk media to the center core.

11. A recording disk cartridge according to claim 8, wherein said recording disk media are stacked by engaging the center cores of said recording disk media by means of spacers each disposed between adjacent center cores; and
   each spacer stops a relative rotation between the adjacent center cores so as to allow the stacked recording disk media to integrally rotate.

12. A recording disk cartridge according to claim 11, wherein the spacer is provided with at least one locking protrusion on each of upper and lower sides thereof for engaging with the center core when the recording disk media are stacked, and the center core has holes for engaging with the locking protrusions, each of which holes is provided at a position corresponding to a position of the respective locking protrusion.

13. A recording disk cartridge according to claim 1, wherein said main body portion of the center core comprises a circular bottom plate and a cylindrical side wall rising from a peripheral rim of the bottom plate, and the collar part widens in an outer diameter direction from an upper end of the side wall.

14. A recording disk cartridge according to claim 13, wherein said recording disk media are stacked by engaging the center cores of said recording disk media by means of spacers each disposed between adjacent center cores; and each spacer stops a relative rotation between the adjacent center cores so as to allow the stacked recording disk media to integrally rotate.

15. A recording disk cartridge according to claim 14, wherein the spacer is provided with at least one locking protrusion on each of upper and lower sides thereof for engaging with the center core when the recording disk media are stacked, and the bottom plate has holes for engaging with the locking protrusions, each of which holes is provided at a position corresponding to a position of the respective locking protrusion.

16. A recording disk cartridge according to claim 15, wherein said spacer comprises a ring-shaped main body portion having a plurality of penetration holes, and said locking protrusions are pins to be pressed into the corresponding penetration holes.

17. A recording disk cartridge according to claim 16, wherein said locking protrusions are arranged so as to protrude alternately at an upper side and a lower side of the spacer.

18. A recording disk cartridge according to claim 1, the cartridge further comprising:

a coupling shaft for rotating said recording disk media with being connected to said center core;

a bearing ball rotationally freely bearing said coupling shaft inside the recording disk cartridge formed with sequentially combining said lower plate, said at least one inner plate, and said upper plate; and a biasing mechanism for pressing the center core of said recording disk medium positioned uppermost toward said lower plate.

19. A recording disk cartridge according to claim 1, wherein said recording disk medium is an optical disk medium.

20. A recording disk cartridge according to claim 2, wherein said recording disk medium is an optical disk medium.

* * * * *